(12) United States Patent
Hall et al.

(10) Patent No.: US 8,594,677 B2
(45) Date of Patent: *Nov. 26, 2013

(54) HANDOVER FOR CELLULAR RADIO SYSTEMS

(75) Inventors: Steven Hall, Harlow (GB); Steven Baines, Bishops Stortford (GB); David Bevan, Bishops Stortford (GB); Andrew Jeffries, Saffron Walden (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,234

(22) Filed: Sep. 14, 2012

(65) Prior Publication Data

US 2013/0012209 A1 Jan. 10, 2013

Related U.S. Application Data

(63) Continuation of application No. 13/461,654, filed on May 1, 2012, which is a continuation of application No. 13/115,388, filed on May 25, 2011, now Pat. No. 8,208,926, which is a continuation of application No. 12/238,141, filed on Sep. 25, 2008, now Pat. No. 7,953,413.

(30) Foreign Application Priority Data

Dec. 21, 2007 (GB) .................................. 0724904.8

(51) Int. Cl.
 *H04W 36/00* (2009.01)
(52) U.S. Cl.
 USPC ............ 455/441; 455/436; 370/331; 370/332

(58) Field of Classification Search
 USPC .......................... 455/436–444; 370/331–334
 See application file for complete search history.

(56) References Cited

U.S. PATENT DOCUMENTS

| 5,239,667 | A | 8/1993 | Kanai |
| 5,678,185 | A | 10/1997 | Chia |

(Continued)

FOREIGN PATENT DOCUMENTS

| JP | 2797594 | 10/1991 |
| JP | 2797595 | 10/1991 |

OTHER PUBLICATIONS

3GPP TS 36.331 V8.0.0 (Dec. 2007); 3rd Generation Partnership Project; Technical Specification Group Radio Access Network; Evolved Universal Terrestrial Radio Access (E-UTRA); Radio Resource Control (RRC); Protocol Specification (Release 8); 56 pages.

(Continued)

*Primary Examiner* — Ajit Patel
(74) *Attorney, Agent, or Firm* — Fish & Richardson P.C.

(57) ABSTRACT

In a cellular wireless system, power thresholds used for determining whether to add or drop servers held in a set of servers, such as an active set, for serving a user equipment (UE) are determined based on the motion of the respective UE. A lower threshold may be used with respect to the adding or dropping of a given server to or from a set of servers for serving a fast moving UE than would be used for the same server with respect to adding or dropping to or from a set of servers for serving a slow moving UE, while maintaining a given quality of service. As a result, the average number of servers held in sets is reduced in a typical network that comprises a plurality of UEs moving at different speeds, compared to a situation in which the threshold is set irrespective of the motion of a UE.

16 Claims, 11 Drawing Sheets

(56) References Cited

U.S. PATENT DOCUMENTS

| | | | |
|---|---|---|---|
| 5,917,811 | A | 6/1999 | Weaver et al. |
| 6,334,047 | B1 | 12/2001 | Andersson et al. |
| 6,725,043 | B2 * | 4/2004 | Bonta et al. ............ 455/437 |
| 7,079,848 | B2 | 7/2006 | Das et al. |
| 2001/0034233 | A1 | 10/2001 | Tiedemann, Jr. et al. |
| 2002/0142773 | A1 | 10/2002 | Rudrapatna et al. |
| 2003/0105903 | A1 | 6/2003 | Garnett et al. |
| 2005/0130662 | A1 | 6/2005 | Murai |
| 2006/0148480 | A1 | 7/2006 | Thorson et al. |
| 2006/0268783 | A1 * | 11/2006 | Julian et al. ............ 370/331 |
| 2007/0010253 | A1 | 1/2007 | Gunnarsson et al. |
| 2008/0076430 | A1 | 3/2008 | Olson |
| 2009/0004665 | A1 | 2/2009 | Robson et al. |
| 2011/0255515 | A1 | 10/2011 | Maeda et al. |

OTHER PUBLICATIONS

3GPP TS 36.304 V8.0.0 (Dec. 2007); 3rd Generation Partnership Project; Technial Specification Group Radio Access Network; Evolved Universal Terrestrial Radio Access (E-UTRA); User Equipment (UE) Procedures in Idle Mode (Release 8); 27 pages.

Office Action issued in U.S. Appl. No. 12/238,141 on Dec. 10, 2010; 7 pages.

Notice of Allowance issued in U.S. Appl. No. 12/238,141 on Jan. 25, 2011; 4 pages.

Office Action issued in U.S. Appl. No. 13/115,388 on Oct. 11, 2011; 6 pages.

Notice of Allowance issued in U.S. Appl. No. 13/115,388 on Feb. 21, 2012; 8 pages.

Office Action issued in U.S. Appl. No. 13/461,654 on Nov. 6, 2012; 6 pages.

* cited by examiner

HANDOVER FOR CELLULAR RADIO SYSTEMS

RELATED APPLICATIONS

This application is a continuation of and claims priority to U.S. patent application Ser. No. 13/461,654, filed on May 1, 2012, which is a continuation of and claims priority to U.S. patent application Ser. No. 13/115,388, filed on May 25, 2011, which is a continuation of and claims priority to U.S. patent application Ser. No. 12/238,141, filed Sep. 25, 2008, which is now U.S. Pat. No. 7,953,413, issued on May 31, 2011, which claims priority to foreign application GB 0724904.8 filed Dec. 21, 2007, which are hereby incorporated by reference in their entirety.

FIELD OF THE INVENTION

The present invention relates generally to cellular wireless data communications networks, and more specifically to a method and apparatus relating to methods of handover for cellular radio systems.

BACKGROUND OF THE INVENTION

As is well known in the art, the concept of handover refers to the process of changing the server or set of servers that communicate payload data with a user equipment. Typically, each server serves a different area of wireless coverage, and a cellular radio base station may be equipped with several servers. The terms handover and handoff are generally used interchangeably in the art.

The process of handover has evolved between generations of cellular wireless; first and second generation systems employed what may be termed hard handover, in which data payload communication to a user was transferred from a single base station to another base station.

In third generation systems, such as UMTS release 99 using code division multiple access (CDMA), so-called soft handover is used, and involves several servers within an active set simultaneously transmitting the same payload data to a user equipment. The user equipment then combines the payload data using a combining algorithm; this is a robust system, in which the redundancy of having two or more base stations serving a user equipment has the effect that communication may be maintained even when communication between the user equipment and another server has failed due to shadowing, multipath fading, interference or other problems occurring in the transmission path. Thus, soft handover provides improved quality of service over hard handover. However, the simultaneous transmissions make demands on radio resource that could otherwise be used to transmit payload data.

In third generation evolutionary systems and fourth generation systems, such as HSPA ('High Speed Packet Access'), and LTE (Long Term Evolution), handover again relates to the selection of a set of servers with which signalling is maintained, corresponding to the active set of a CDMA system, but in addition there is a process of selection of the best server within the set for data payload transfer, potentially on a packet-by-packet basis, a process known as best server selection and also known as re-pointing or fast server selection. Signalling is maintained between each user equipment and the set of servers but payload data is only sent between the best server and the user equipment, thus making efficient use of radio resource. However, it is none the less necessary to send duplicate data across the backhaul network to each server in the set in order that the data is available for selection should a given server be selected as best server. The disadvantage of sending duplicate data is that this places demands on backhaul resource.

The server within the set that provides the highest pilot signal power received at a user equipment over a measurement period is known as the primary server. A pilot signal is a component of a signal that is transmitted at a known amplitude; in the case of a CDMA, a pilot signal is typically a signal component that is transmitted with a scrambling code but not a Walsh spreading code. In the case of an orthogonal frequency division multiplexed (OFDM) signal, a pilot signal may comprise one or more subcarriers that are transmitted with predetermined amplitudes and phases at predetermined times and frequencies. Measuring the power of a pilot signal is thus a reliable way of determining a measure of the signal power, since variations due to modulation with unpredictable payload data are removed. The power of a pilot signal is however not the only possible measure of received signal power; for example, an average of a received signal strength indicator (RSSI) may be used to indicated received signal power. It should be understood that when reference is made to the power of a received signal, that power may be measured in terms of the power of a pilot signal or by other methods known in the art.

As user equipments move within a network between areas of coverage of different servers, the set and indeed the primary server will change. The network continually determines which servers should form the set for a given user equipment based, for example, on the received power of base station pilot signals as measured by the user equipment and reported to the network.

For example, FIG. 1 illustrates a user equipment 1 in communication with a set of servers 2a and 2b but not in communication with a third server 2c. The servers 2a, 2b, 2c are connected to a radio network controller 3 via a telecommunications network 5. Typically the radio network controller controls the handover process. Thresholds are typically set by network operators to determine when to add or drop a server from the set for a user equipment in dependence on the measured received signal powers. Such thresholds are typically set in terms of received power of the server signal relative to the received power of the primary server signal. This may be expressed as a window of powers between the threshold power and the received power of the signal originating from the primary server, that is to say a power level range relative to the power of the signal associated with the primary server. A server may be added if its received power falls within the window, or above the threshold. The difference between the threshold and the received power of the primary server signal may be termed a margin. The margin is typically expressed in decibel (dB) terms; a difference in decibel values corresponds to a ratio of power levels expressed in linear terms.

FIG. 2 illustrates an example of a physical layout of servers 2a, 2b and 2c, their respective areas of coverage 4a, 4b and 4c, and the trajectory 6 of a user equipment moving relative to the servers.

FIG. 3 illustrates how the received power from the respective servers at a user equipment varies as the user equipment moves along the trajectory 6; received powers from servers 2a, 2b and 2c are indicated by curves 8a, 8b and 8b respectively. A threshold 10 is shown and the difference 12 between the threshold and the primary server power (the primary server power being shown by the sections of 8a and 8b shown as bold lines) is the margin, while the power range within the difference 12 is the window as previously mentioned. In the example of FIG. 3 a single threshold is used for determining the adding or dropping process. It can be seen that as the user equipment moves from point A via B to C that server 2b will be added to an active set at position 9, as the power 8b exceeds the threshold 10. At point 11, server 2c will also be added, and at point 13 server 2a, assumed already a member of the set, will be dropped, followed by the dropping of server 2b at position 15.

In practice, different add and drop thresholds may be selected (relative to the primary server power), so that hysteresis is provided meaning that servers are not repeatedly being added or dropped to the active set as they fall above or below a single threshold. In the case of CDMA systems, typical operator settings would have the effect of adding to an active set any server which has a pilot power as measured by the user equipment of 4 dB lower than the primary server pilot power or better, and to drop from the active set any server which has a pilot power as measured by the user equipment of 8 dB lower than the primary server pilot power or worse.

Practical systems differ from the simple situation illustrated by FIG. 3 in that there are time constants involved in the process of adding or dropping servers. Typically, when a received signal from a server exceeds a threshold, a timer is started and if the threshold is still exceeded when the timer times out, then the process of adding the server to a set, typically an active set, takes place. Similarly, when a received signal from a server falls below a threshold, a timer is started and if the signal still falls below the threshold when the timer times out, then the process of dropping the server from a set can take place. The thresholds and the times between the start and end of a count, that is to say when the timer counts out, need not be the same for adding as for dropping a server from a set. This time delay may be imposed to prevent the adding or dropping of servers due to transitory changes in signal powers.

In addition to the time taken to decide to add or drop a server, there is also a period of time required to implement the adding or dropping process. Taking the example of adding a server to an active set in a CDMA system, the process typically involves signalling from the user equipment to one or more servers and from there to a radio network controller to indicate that the threshold has been passed to the required certainty. The radio network controller will then typically make a decision as to whether or not to add a server to the active set on the basis, for example, of available resources. A message will then need to be sent to the existing members of the active set of servers serving the user equipment indicating to the user equipment that it should expect to receive signals from the server joining the active set, communicating amongst other data the Walsh code that new server will be using. This message is then required to be passed on from the members of the existing active set, or from a sub-set of them, that may include only one server, to the user equipment. If the signal received from all of the existing active set falls below a minimum level, then communication to the user equipment may not be possible. The generation, sending and receiving of the above messages takes time, and if the communication from the existing active set is lost before the user equipment receives the information that a new member of the active set has been added, then the handover process may fail and any call taking place may be dropped.

The detail of the messaging may vary between systems, but typically there is a time delay between the crossing of a power threshold and communication being established between a user equipment and a server newly added to a set.

If a greater number of servers is maintained in the active set, for example by setting a lower threshold for adding a server to the active set, there may be a greater probability that communication may be maintained with at least one server, and so there may be a lower rate of dropped calls. However, as has been mentioned, this is at the expense of network capacity.

Typically, a network operator is able to balance the need for efficient utilization of network capacity (particularly on the downlink) and quality of service (for example probability of dropped calls) through network planning, including geographical cell planning, server selection, antenna orientation, and through choice of power thresholds or windows for adding and dropping servers from an active set. So it can be seen that whilst it is undesirable to have too many servers in the active set for a given user equipment, too few can result in quality of service issues.

One problem with the currently implemented methods described above is that they tend to be network-wide; that is to say that thresholds or windows for adding or dropping servers from active sets are specified across an entire network. These network-wide thresholds or windows do not take into account the differences in the radio environment that individual user equipments may be experiencing and are thus likely to be suboptimal for any given region of the network.

SUMMARY OF THE INVENTION

In accordance with a first aspect of the present invention, there is provided a method of handover in a cellular radio communications network comprising a plurality of servers, one or more of the servers being in a set of servers for serving a user equipment and the user equipment being capable of receiving signal power from each of the plurality of servers, the method comprising:

measuring the signal power received at the user equipment from at least one server of the plurality of servers;

evaluating a factor indicative of the motion of the user equipment;

determining a threshold of signal power for the signal from the at least one server in dependence on said factor; and determining whether or not the at least one server should be added to or dropped from the set on the basis of a comparison of the measured signal power received from the at least one server with said threshold.

A benefit of determining the threshold on the basis of a factor indicative of the motion of the user equipment is that, in a network comprising a plurality of user equipments moving at different speeds, the average number of servers held in sets of servers for serving the user equipment is reduced. This is because faster moving user equipments require a lower threshold than slower moving user equipments, and so if—per conventional methods—the same threshold is used regardless of the speed of a user equipment, an unnecessarily high average number of servers are held in sets for serving slow moving user equipments. A reduction in the average number of servers held in sets of servers for serving the user equipment has the benefit of reducing data traffic loading in a backhaul network, since the need to send duplicated data to each member of sets of servers is reduced.

Preferably, the threshold is determined in dependence on a margin and the evaluated power from the primary server; the benefit of this is that, in code division multiple access systems, since the primary server appears as a source of interference, the threshold is in effect set in terms of carrier to interference ratio which is a good indicator of signal quality. In systems using best server selection, setting the threshold in dependence on a margin from a primary server, also known as the best server, is a convenient method to control the number of servers admitted to a set of servers for serving the user equipment.

Conveniently, the set of servers is an active set of servers in a cellular radio communications network using code division multiple access. The benefit of a reduction in the average number of servers held in active sets of servers is an increase in the data payload capacity a network, since the radio resource is used more efficiently because the proportion of servers sending duplicate data is reduced.

Conveniently, the threshold is determined in dependence on a predetermined threshold and an adjustment component that is dependent on the motion of the user equipment. The benefit is that an adjustment component may be calculated independently of knowledge of a predetermined threshold.

Preferably, the factor indicative of motion of the user equipment is determined in dependence on the Doppler spread of a signal received from the user equipment at one or more servers. This has the benefit that motion of the user equipment can be determined on the basis of a single frequency analysis operation that may require samples of the received signal to be taken over a shorter time period than would be required to deduce the motion of the equipment from a succession of measurements of signal level. A further advantage is that Doppler spread in a typical environment that is rich in multipath sources gives an indication of speed that takes into account both radial and tangential components of the motion of a user equipments.

In one arrangement, the Doppler spread is determined by transforming a pilot signal to the frequency domain and quantifying a range of frequencies comprising the transformed signal. A benefit of this is that a pilot signal is transmitted with a known frequency composition, so that Doppler spread may be accurately quantified.

Conveniently, the factor indicative of motion of the user equipment is determined from the Doppler spread of a signal received at the user equipment from a server. A benefit of this is that the threshold may be determined within the user equipment without the need to communicate with a radio network controller.

In one arrangement, the factor indicative of motion of the user equipment is determined from data generated by a satellite navigation receiver at the user equipment. A benefit of this is that the threshold may be determined within the user equipment without the need to signal to a radio network controller.

Advantageously, the factor indicative of motion of the user equipment may be determined from the rate of change of the strength of the signal received at least one server from the user equipment. A benefit of this is that the component of the direction of movement of the user equipment towards or away from the user equipment may be determined in addition to the speed.

Conveniently, the factor indicative of motion of the user equipment may be determined from the rate of change of the strength of the signal received from at least one server at the user equipment. A benefit of this is that the component of the direction of movement of the user equipment towards or away from a server may be determined in addition to the speed, without the need to signal to a radio network controller.

Preferably, the factor indicative of motion of the user equipment comprises an indication of the direction of motion of the user equipment and the threshold applicable for a given server is determined to be lower if the direction of motion is towards the given server than if the direction of motion is away from the given server. A benefit of this is that the average number of servers held in sets of servers for serving user equipment may be reduced, in a network comprising a plurality of user equipments moving in different directions.

In one arrangement, it is determined whether or not a given server should be added to or dropped from a set on the basis of a quality factor assigned to the given server. Conveniently, the quality factor is indicative of the expected rate of change of the strength of a signal received from the at least one server said by a user equipment in an area of coverage of the at least one server. Preferably, the quality factor is indicative of a history of dropped calls associated with the at least one server. The benefit is that higher thresholds may be set for servers with a lower expected rate of change of signal strength or a low historical probability of dropped calls than for servers with a higher expected rate of change of signal strength or a higher historical probability of dropped calls; as a result the average number of servers held in sets of servers for serving user equipment in a network comprising servers with a variety of assigned quality factors can be reduced.

Apparatus, such as base stations, base station controllers (or radio network controllers) and other apparatuses arranged to perform the above methods are also provided. Apparatuses and methods combining the two aspects of the present invention are also provided.

Further features and advantages of the invention will become apparent from the following description of preferred embodiments of the invention, given by way of example only, which is made with reference to the accompanying drawings.

Figure 10:
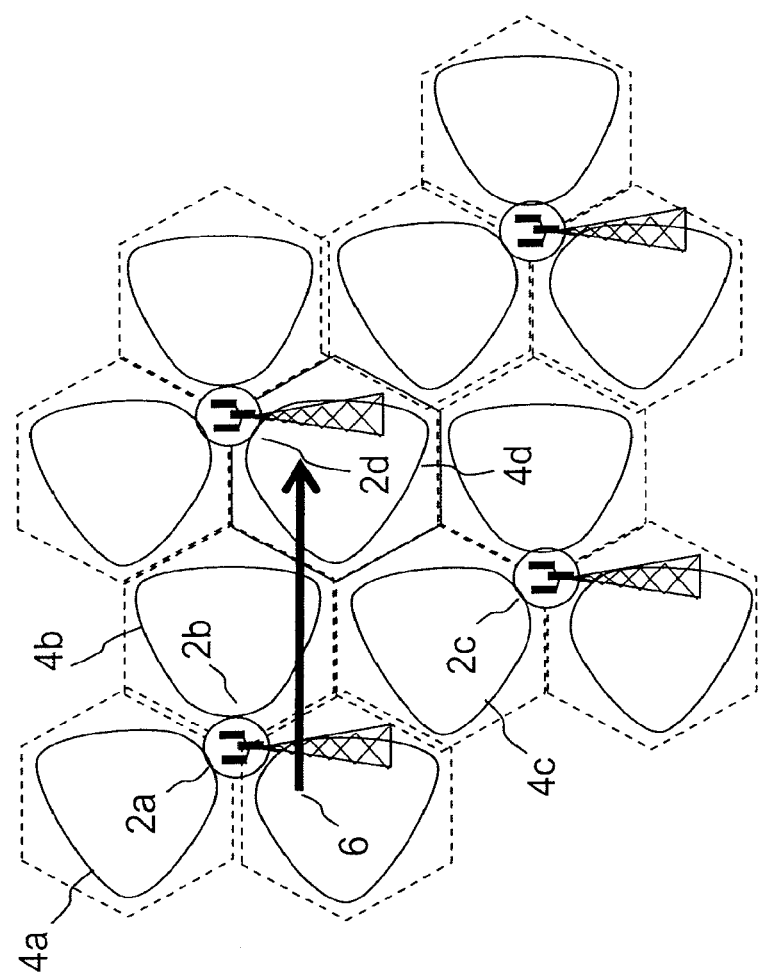
Figure 11:
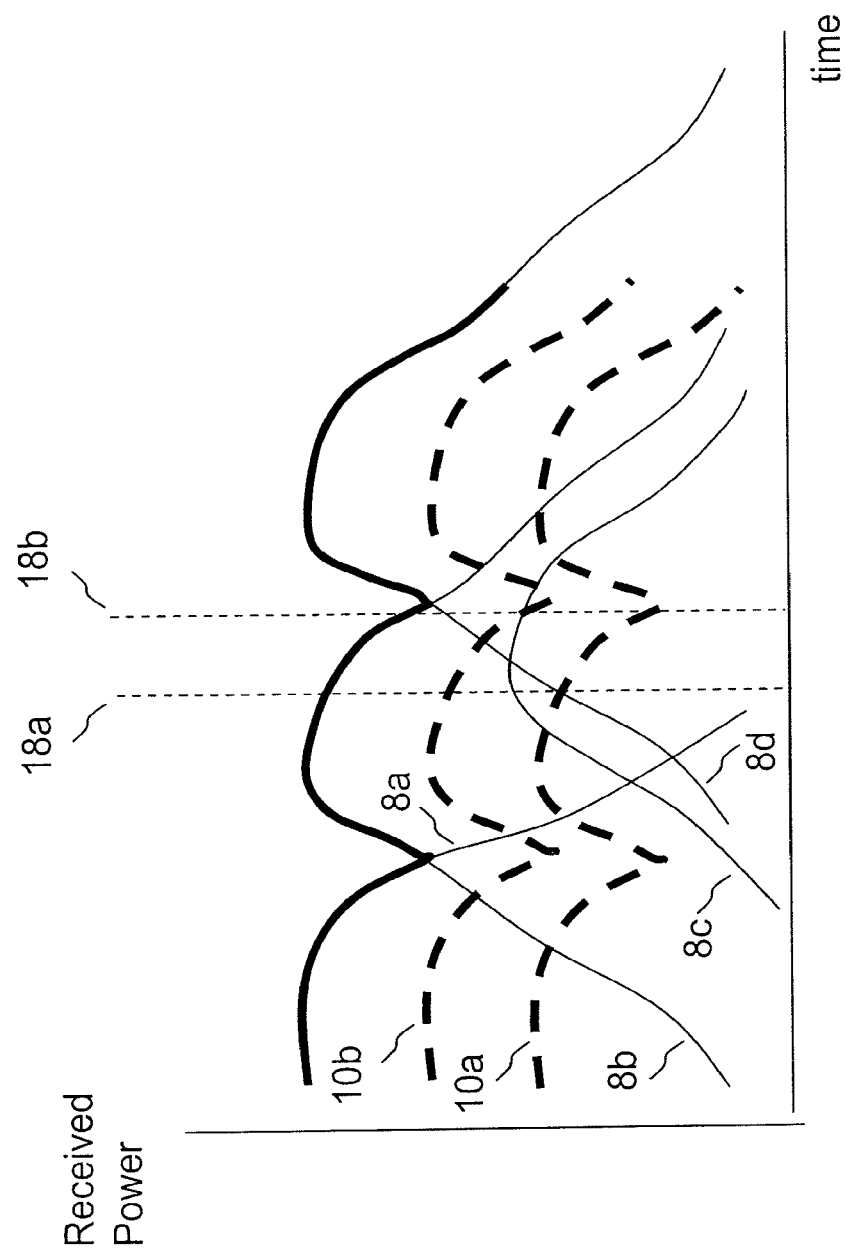
Figure 12:
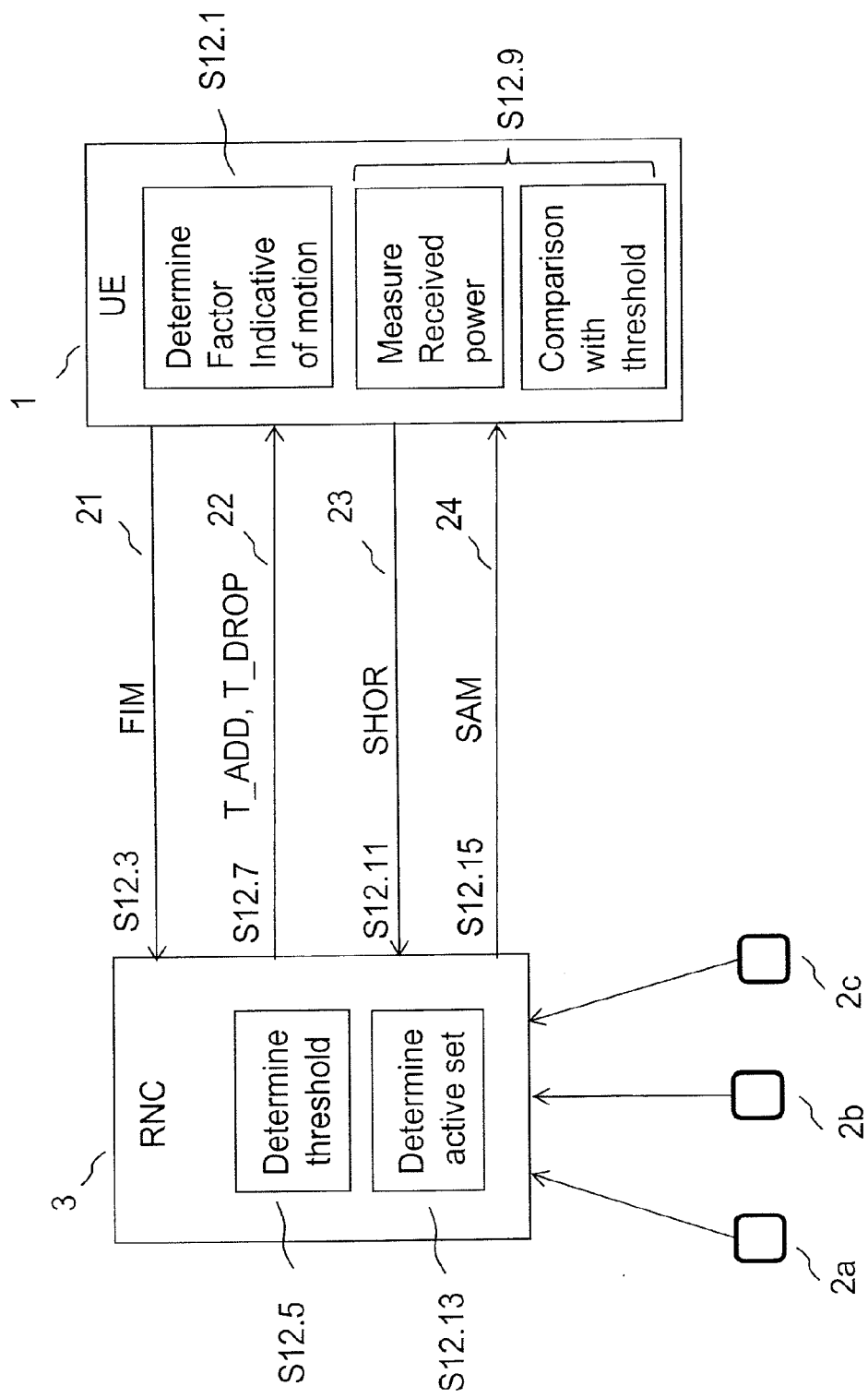

8 and showing a lower threshold for admission of servers to a set in an environment experiencing blocking according to an embodiment of the invention;

FIG. 10 is a schematic diagram showing an example of a trajectory of a user equipment across a cellular system as an illustration of an embodiment of the invention;

FIG. 11 is a diagram showing, as a function of time, received power on a logarithmic scale at a user equipment moving along the trajectory of FIG. 10 and showing a threshold for admission of servers to an active set specific to a server according to an embodiment of the invention; and FIG. 12 is a diagram showing a typical logical flow of messages in a CDMA system implemented as an embodiment of the invention.

DETAILED DESCRIPTION OF THE INVENTION

In general, the present invention is directed to methods and apparatus that improve handover in cellular radio systems, in particular improving network capacity for networks involving a mix of fast and slow moving, including static, user equipments.

For clarity, the methods and apparatus are described mainly in the context of a network operating to a CDMA standard, and a set of servers will be referred to as an active set, but it will be appreciated that this is by way of example and that the methods and apparatus described are not limited to this example. In particular, the methods and apparatus are suited to operating within a high speed packet data system such as HSPA, LTE, or Wimax. In a system employing best server selection, also known as fast server selection or pointing, a set of servers is maintained from which a best server can be selected, potentially on a packet-by-packet or frame-by-frame basis. This set is analogous to the active set of a CDMA, and aspects of the invention can equally be applied to such a set as to an active set in a CDMA system.

Figure 2:
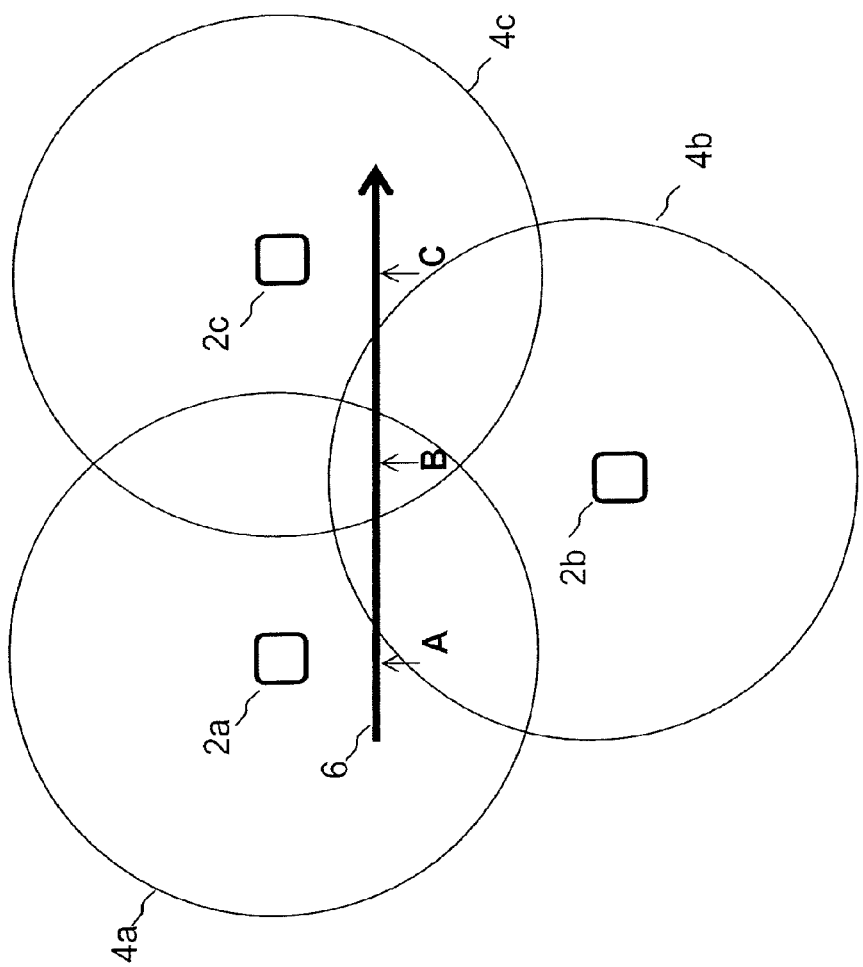
FIG. 2 is a schematic diagram showing an example of an arrangement of servers and a trajectory of a user equipment for use in describing the operation of an embodiment of the invention.
Figure 3:
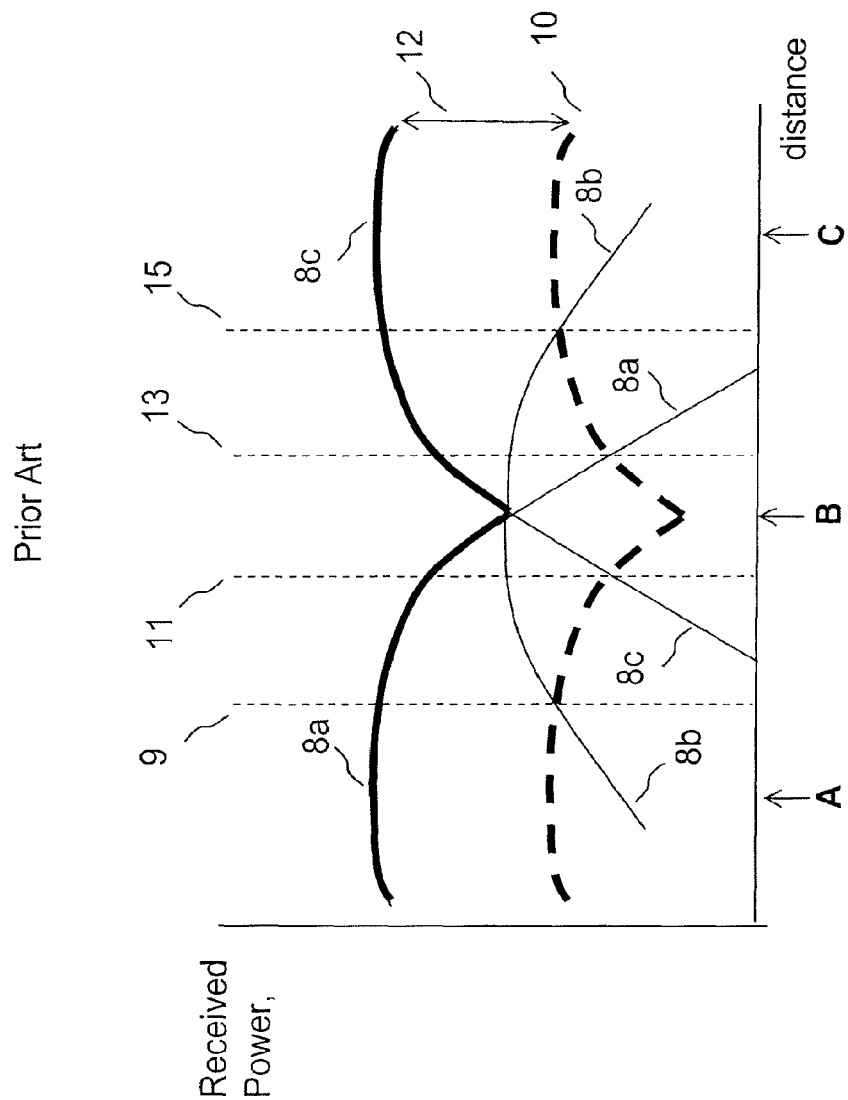
FIG. 3 is a schematic diagram showing received power on a logarithmic scale at a user equipment as a function of distance along the trajectory of FIG. 2 and showing a threshold for adding and dropping servers to a set according to a conventional method.

As already mentioned, FIG. 3 illustrates the conventional use of a threshold 10 in a cellular wireless system as has already been described with reference to FIGS. 1 and 2, for determining whether to add or drop a server to or from an active set of servers.

Figure 1:
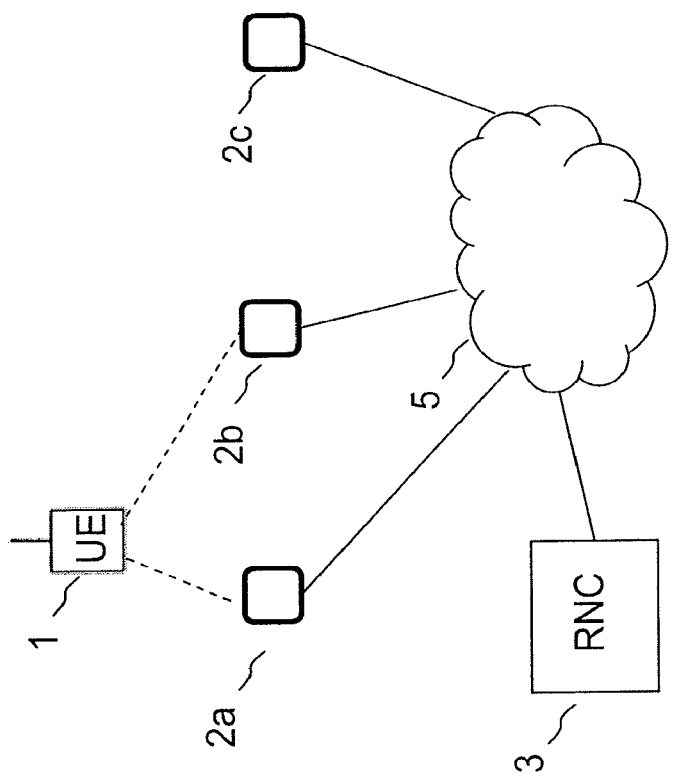
FIG. 1 is a schematic diagram showing the topology of a network according to an embodiment of the invention.
Figure 4:
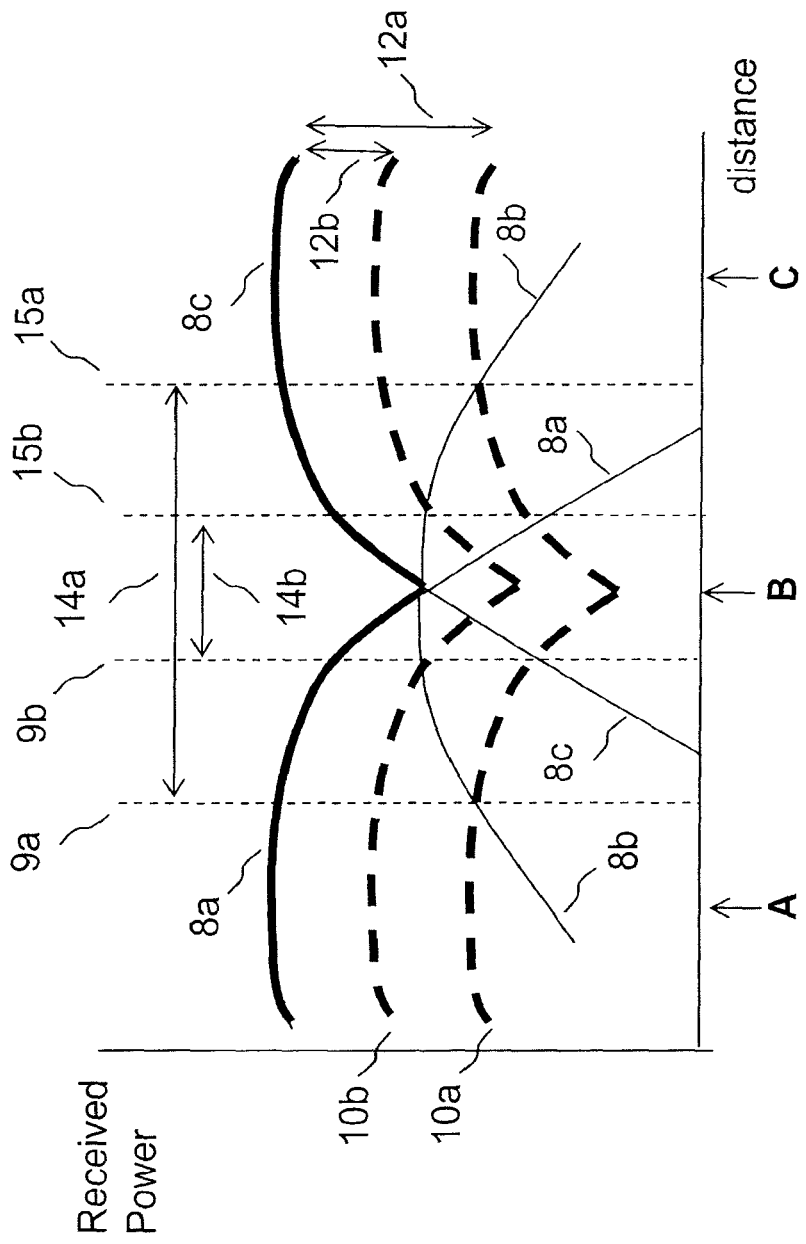
FIG. 4 is a schematic diagram showing received power on a logarithmic scale at a user equipment as a function of distance along the trajectory of FIG. 2 and showing thresholds for adding and dropping servers to a set according to an embodiment of the invention.

FIG. 4 illustrates an embodiment of the invention applied to the network topology of FIG. 1 for a user equipment moving through the network with the trajectory 6 of FIG. 2. It can be seen in FIG. 4 that two different thresholds are shown; the higher of these, 10b, is applicable to a slow moving or static user equipment, and the lower, 10a, is applicable to a fast moving user equipment.

By comparison with FIG. 3, in which the vertical scale is intended to be similar, it can be seen that the threshold 10b for a slow moving or static equipment has been set at a higher level than would be used for a conventional network-wide threshold level; according to embodiments of the invention, the threshold may be set according to a factor indicative of the motion of the user equipment, so for a slow moving or static user equipment, the threshold may be set at a higher level than for fast moving equipment. That is to say that the margin 12 between the threshold and the primary server is reduced and so the window for the admission of servers to an active set is reduced. The benefit of the variable threshold will now be described.

The problem with a conventional method of setting a threshold, in which a network-wide threshold is set, is that the threshold has to be set to meet the needs of most demanding scenario; generally this will be a fast-moving user equipment and/or a server in an environment with significant obstructions to the radio propagation path, such as urban "street canyons" between tall buildings. In such demanding scenarios, it is beneficial to hold a higher number of servers in an active set, since this reduces the chances that all of the set will be lost due to rapid changes in the radio propagation due to the motion of the user equipment and blocking by obstructions. In addition, it is advantageous to keep at least a minimum number of servers in an active set, in order to maintain signal quality by diversity combination. What is more, it is advantageous to admit a new server to the active set early on in such demanding conditions, since, as has been already mentioned, it will take a finite amount of time to establish the new server in the active set and communicate to the user equipment to instruct it to receive the signal from the new server. For example, in CDMA systems the user terminal needs to be instructed as to which spreading, or Walsh, code is to be received from the new server. The sooner the new server is admitted to the active set, the less the chance that communication with the user equipment from the existing active set will be lost before the new server can be received, a situation that may result in a dropped call.

However, in a mobile network, it is generally a minority of user equipments that are fast moving. In fact, in many cases the majority of users are moving at less than 1 m/s, and many of these are static.

To certain extent the range of speeds of user equipments connected to a base station depends on the location of the base station at which the server is located; servers close to a road with fast-moving traffic or close to high speed train lines may be expected to show quickly changing signal levels. Even so, in the majority of cases, there is a predominance of base stations at which the majority of users are slow moving or static, and at which the signals level received by a user equipment tend to vary slowly in most cases due to a variety of factors, including the speed of the motion of the user equipments and the multipath and blocking environment in terms of radio frequency propagation.

Conventionally the add and drop thresholds for a network will be set on the basis of drive testing, in which statistical information is gathered by carrying a user equipment in a vehicle and moving about within the network at various speeds and locations, logging the performance of the link to the user equipment and the network, including quality of service metrics such as dropped call rate. Thresholds are set as a trade off between quality of service and network capacity, as has been already mentioned, on a network-wide basis.

However, it has been estimated that if, as an embodiment of the present invention, a higher threshold is used for slow moving or static user equipments than for fast moving user equipments, a significant increase in network capacity can be achieved. For example, it has been shown that a capacity increase of approximately 20% may be expected compared with a network using a uniformly applied add and drop threshold set with a margin of 6 dB compared to the primary server. It is to be noted that the results obtained using a using an add margin of 4 dB and a drop margin of 8 dB are similar to those obtained using a margin of 6 dB for both add and drop thresholds, in terms or relative capacity.

The dependence of the threshold on speed may be a continuous or stepped function, so that there may be for example be many values of threshold to be chosen amongst as a function of measured speed range. A particularly useful case is the application of two values of threshold according to a classification of user equipment speed as slow or fast based on an approximate speed threshold. For example, a margin of 3 dB may be applied relating to user equipment speeds below approximately 15 m/s and 6 dB for speeds above this, giving an improvement over a fixed threshold of approximately 15% in capacity compared to a system with a fixed margin of 6 dB.

For comparison, it has been shown that if a threshold is continuously variable (subject to a minimum margin of 1 dB), an increase of approximately 22% in system capacity may be expected compared to a system with a fixed margin of 6 dB.

Returning to FIG. 4, it should be noted that for the sake of clarity the operation of the network is illustrated with the simplifying assumption that the same threshold is used for adding as for dropping a server; that is to say no hysteresis is shown. In practice, and as already mentioned, it is generally beneficial to use a system with hysteresis, that is to say a difference between thresholds for adding as opposed to dropping a server, with the benefit of reduced requirement for signalling since the incidence of adding and dropping is reduced. In such a system, the thresholds illustrated in FIGS. 3 and 4 may be considered as add thresholds, and the associated drop thresholds would be lower by an appropriate amount; typically drop thresholds are lower than add thresholds by approximately 3 to 6 dB, but other values may be used as appropriate to the system in question.

In FIG. 4 it can be seen that movement of a user equipment along the trajectory 6 of FIG. 2 is represented by a change in position on the horizontal axis of FIG. 4 through points A, B and C. The received powers from servers 2a, 2b and 2c are represented by curves 8a, 8b and 8c respectively.

Taking firstly the case of a fast moving user equipment, it is assumed that at point A on the horizontal axis, server 2a is already included in the active set of servers. At position 9a, the power received from server 2b, represented by curve 8b crosses threshold 10a and (neglecting effects related to time constants), server 2b is added to the active set. At position 15a, however, the received power from server 2b falls below the threshold 10a (on the assumption of a zero hysteresis system) and so the server 2b is dropped from the active set. It will therefore be appreciated that the server 2b is held within the active set over the region 14a.

Now considering the case of a slow moving or static user equipment, it is again assumed that at point A on the horizontal axis, server 2a is already included in the active set of servers. At position 9b, the power received from server 2b, represented by curve 8b crosses threshold 10b and server 2b is added to the active set. At position 15b, the received power from server 2b falls below the threshold 10b and so the server 2b is dropped from the active set. It can be seen that this case, the server 2b is held within the active set over the region 14b which is smaller than 14a. The server 2b is thus held in the active set over a smaller region of the network for a slow moving user equipment than for a fast moving user equipment. Clearly, the other servers will similarly be held in the active set over a smaller region of the network for a slow moving user equipment than for a faster moving user equipment. So, it can be seen that providing a higher threshold for slow moving or static user equipments has the effect that over the network taken as a whole, fewer servers will be held in active sets than would be the case if a universal threshold were applied at the level applicable for a fast moving user equipment.

Figure 5:
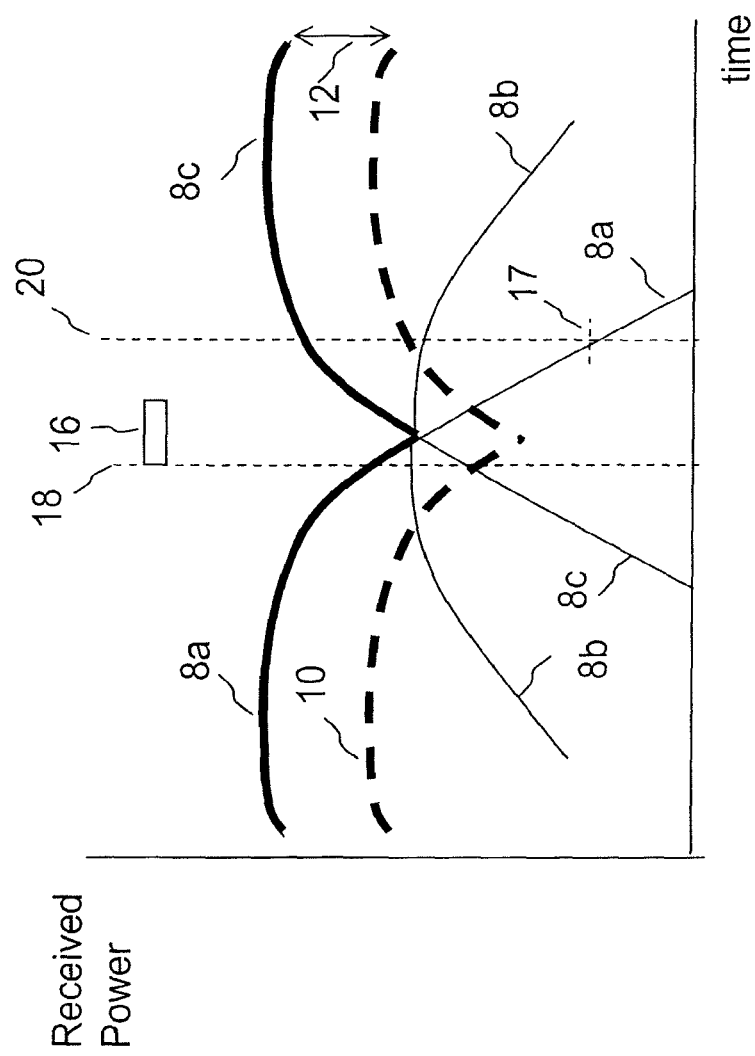
FIG. 5 is a schematic diagram showing as a function of time, received power on a logarithmic scale at a slow moving user equipment moving along the trajectory of FIG. 2 and showing a first threshold for admission of servers to an active set for a slow moving user equipment according to an embodiment of the invention.
Figure 7:
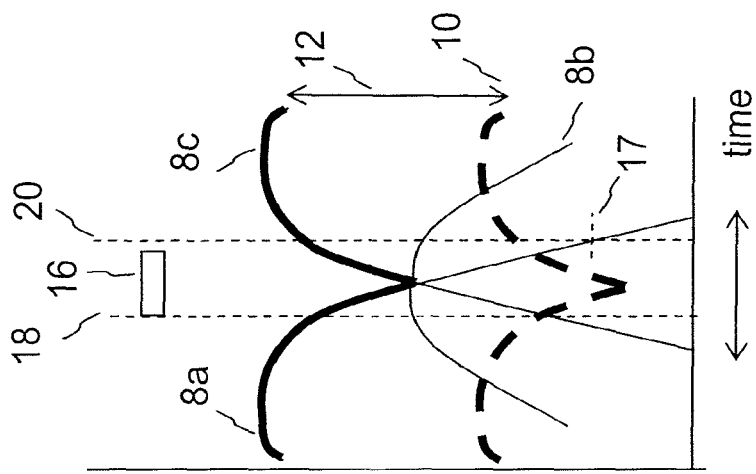
FIG. 7 is a schematic diagram showing as a function of time, received power on a logarithmic scale at a fast moving user equipment moving along the trajectory of FIG. 2 and showing a second threshold for admission of servers to a set according to an embodiment of the invention.
Figure 6:
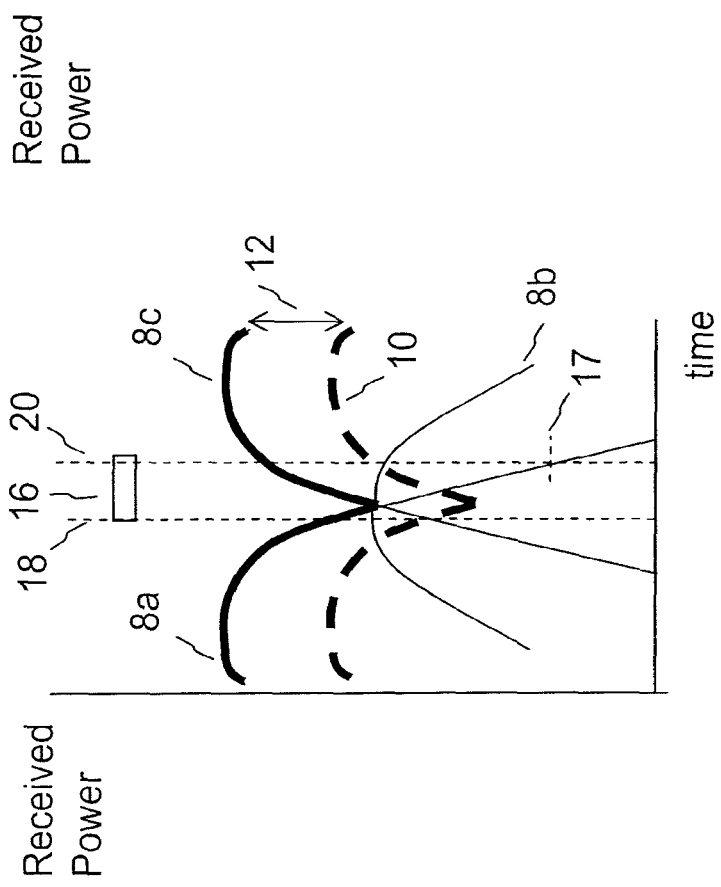
FIG. 6 is a schematic diagram illustrating the problems that would be experienced if a fast moving user were to operate using the first threshold of FIG. 5.

FIGS. 5, 6 and 7 illustrate an embodiment of the invention applied to the network topology of FIG. 1 for a user equipment moving through the network with the trajectory 6 of FIG. 2, with the horizontal scale representing time rather than distance as was the case in FIGS. 3 and 4. FIG. 5 illustrates the case of slow moving user equipment and FIGS. 6 and 7 illustrate the case of a faster moving user equipment. For the purposes of this illustration, a slow moving user equipment may, for example, have a speed of less than 10 m/s whereas a faster moving user equipment may have a speed of greater than 10 m/s. It should be noted that the rate of change of signal strength depends on other factors than the speed of the user equipment, such as the distance between base stations and the radio propagation conditions, so that the value of 10 m/s quoted in this illustration is simply an example.

FIG. 5 shows the variation of power as a function of time 8a, 8b, 8c from each of respective servers 2a, 2b and 2c. In the case of FIGS. 5, 6 and 7 the threshold 10 is a threshold for the addition of a server to an active set. A similar threshold (not shown in this case), that may be at the same or a different level, exists for dropping a server from the active set.

The period of time 16 required to add a new server can be seen from FIG. 5: the threshold 10 is crossed by the received power 8c from server 2c at time 18. After the time period 16, server 2c is admitted to the active set. However, there will be a received signal level 17, at which server 2a, which is already assumed to be in the active set, will no longer to communicate with the user equipment; this occurs at time 20 in FIG. 5. It can be seen that the period 16 for adding server 2c ends before communication is lost with server 2a. On the assumption that server 2b has been added to the active set ahead of server 2c, it can be seen that during the handover period from server 2a to server 2c, at least two servers are maintained within the active set, which is beneficial in terms of reducing the probability of dropped calls.

It should be understood that in practice the received signal level 17 will depend on the interference and noise environment, in which signals from other equipment may considered as interference, and so the level 17 will typically not be a constant received power level.

Considering now FIG. 6, this illustrates what would happen if the same threshold were to be used for a fast moving user equipment as for a slow moving user equipment. It can be seen that the period 16 for adding server 2c ends after communication is lost with server 2a. As a result, the number of servers maintained within the active set falls to one in the handover period, risking dropped calls.

A solution according to an embodiment of the invention is shown in FIG. 7. The use of a lower threshold 10 allows the start of the admission process of servers to the active set earlier than would be the case with a higher threshold, so that the time 18 occurs earlier than was the case in FIG. 6. As a result, the period 16 for adding server 2c ends before communication is lost with server 2a, with the beneficial result that at least two servers are maintained within the active set in the handover period.

The period 16 for adding server may be quite significant; in some systems such as UMTS it may be as long as 500 ms.

Figure 8:
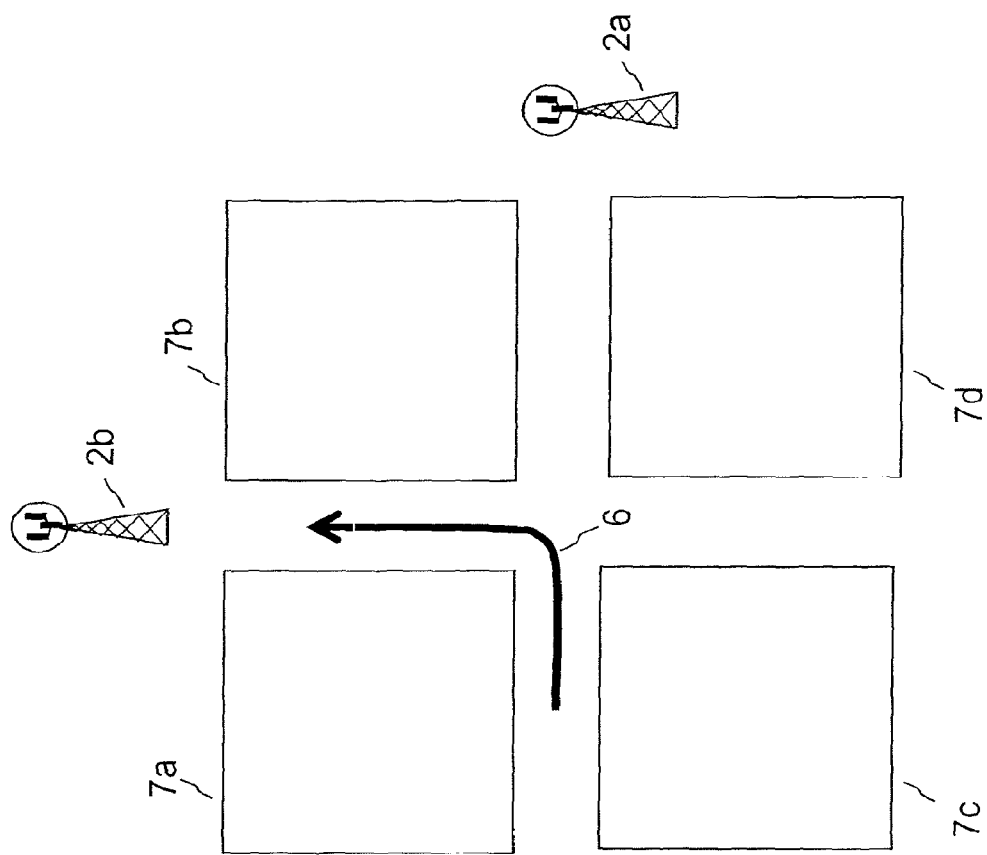
FIG. 8 is a schematic diagram showing an example of a trajectory of a user equipment in an environment experiencing blocking as an illustration of an embodiment of the invention.

FIG. 8 shows a trajectory 6 of a user equipment through an environment with significant blocking of radio frequency propagation, due to obstructions 7a, 7b, 7c, 7d such as buildings. Initially the user equipment has a line of sight to server 2a and server 2b is obstructed and on turning the corner as shown a line of sight becomes available to server 2b but server 2a is obstructed. The transition between these two states may be rapid. When a server is obstructed, some signal may still be received due to multipath, but this is typically quite variable and may be at a low level.

Figure 9:
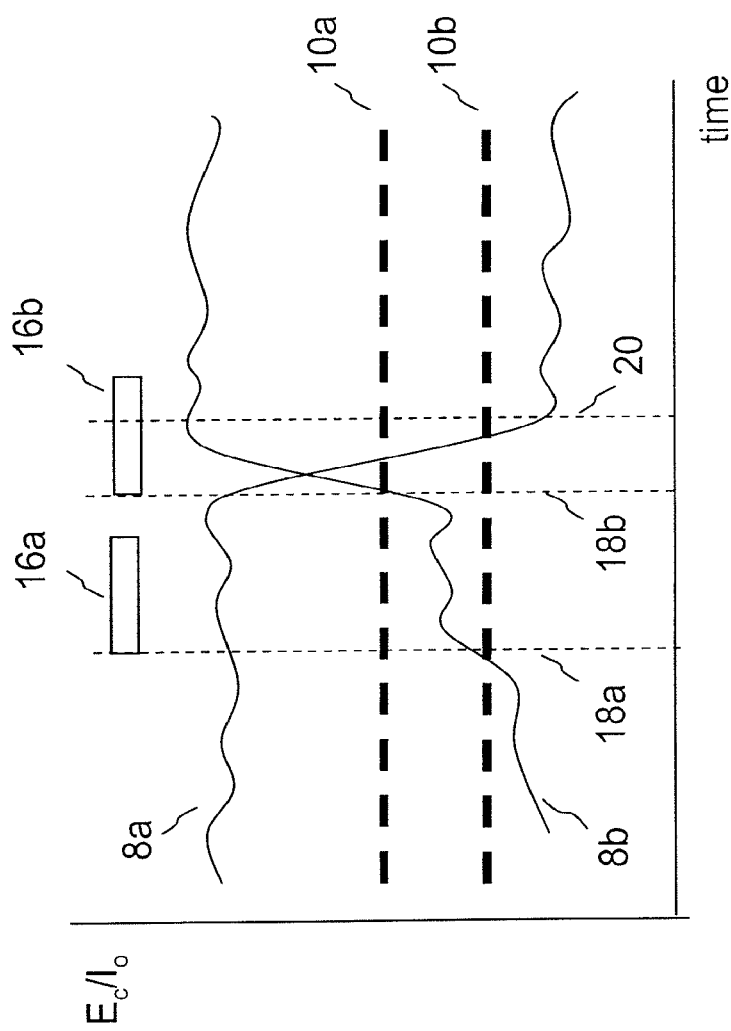
FIG. 9 is a schematic diagram showing, as a function of time, received power as measured by $E_c/I_0$ on a logarithmic scale at a user equipment moving along the trajectory of FIG.

FIG. 9 illustrates the operation of an embodiment of the invention for a user equipment moving along the trajectory of FIG. 8. The environment may be harsh as shown by a history of dropped calls due to the obstructions, and so a lower threshold 10b may be imposed for servers 2a and 2b than the threshold 10a used for servers in a benign environment with a history of a better quality of service, for example as measured by the rate of dropped calls. The dependency of threshold on speed of the user equipment may differ for a server in a harsh rather than a benign environment. For example, a lower threshold $10b$ may be imposed for moving equipments at this server than for user equipments moving at the same speed at servers with a more benign environment; the rapid transitions between servers may also occur in the case of a relatively slow moving user equipment turning a corner close in to a building. However, the case may be different for user equipments that are static; these may not need a lower threshold than would be imposed for a static user equipment at another server, since for these user equipments the rate of change of signal strength may be no greater than that expected for other servers in a supposedly more benign environment.

It can be seen from the curves $8a$, $8b$ representing the received powers from servers $2a$ and $2b$ respectively that the use of a lower threshold $10b$ allows the period $16a$ required for the addition of server $8b$ to the active set to expire before communication is lost with server $2a$ at time $20$ when the signal level falls below an acceptable level. For this to happen, the threshold $10b$, in particular the add threshold, will typically be set at a low enough level that a server can be added on the basis of signals received due to multipath when the line of sight is heavily obstructed. As will be apparent, the benefit is statistical, since it will not always be possible to achieve handover in these circumstances if obstructions result in very deep fades.

By contrast, a higher threshold $10a$, that may be suitable for use in more benign environments, would not allow time to add server $2b$ before server $2a$ drops out, since time period $16b$ would expire after time $20$.

As shown in FIG. 9, a threshold may be set in terms of a measure known as $E_c/I_0$, rather than simply received power. The use of this measure is however not limited to the case illustrated by FIG. 9; it could equally well be applied to any example of the use of a threshold. $E_c/I_0$ is the power of a respective pilot relative to the total power received.

For the case of a threshold $10$ expressed as margin below a primary server level, it makes no difference whether the received power of the server in question and the primary server is expressed as simply the power of a pilot or as $E_c/I_0$, since the margin will be the same in dB terms. The ratio of the $E_c/I_0$ value of a given server to the $E_c/I_0$ value of the primary server is thus simply the ratio of the respective pilot powers, since the $I_0$ terms cancel. Hence, the vertical scales of FIGS. 3-7 and 11 could equivalently be labelled $E_c/I_0$.

However, as illustrated by FIG. 9, a threshold for adding or dropping servers may alternatively be set as an absolute value of $E_c/I_0$, rather than a level relative to the received power of a primary server. In many cases in practice the primary server dominates the value of $I_0$ and so the effect is little different from the case where relative values are used, except for a constant offset value. Of course, different absolute threshold levels may be used for adding than for dropping servers from a set, similarly to the case for relative levels. An absolute threshold level as described may be applied to any situation in which a threshold relative to the received power of a primary server is applicable. The advantage of the use of an absolute value of $E_c/I_0$ to set a threshold is that in some cases this value may be more readily available within a user equipment than the relative power levels of a primary server and the server in question, since the total power received may be easier to measure than the power of a pilot of a primary server.

FIG. 10 shows a trajectory $6$ of a user equipment across a cellular network, comprising base stations at which are located servers $2a$, $2b$, $2c$, $2d$ serving respective areas of coverage in sectors $4a$, $4b$, $4c$ and $4d$.

FIG. 11 shows the variation of received power $8a$, $8b$, $8c$, $8d$ received from servers $2a$, $2b$, $2c$ and $2d$ respectively at a user equipment moving along the trajectory $6$ of FIG. 10.

FIG. 11 illustrates that in an embodiment of the invention a threshold for the adding or dropping of a server to or from the active set for serving a user equipment may be set according to the motion of the user equipment with respect to the server. For example, as illustrated here, a lower threshold $10b$ may be set for the adding a server to the active set if, as is the case of server $2d$, it is in the projected path of the user equipment. By contrast, server $2c$, that is not in the projected path of the user equipment may be given a threshold $10b$ that is higher than $10a$. Hence the server $2c$ is unlikely to be added to the active set since in the example of FIG. 11 the received power $8c$ only fleetingly exceeds threshold $10b$ at time $18b$ and this is unlikely to trigger the addition to the active set as previously discussed due to the need to stay above the threshold for the duration of a timer period By contrast, the power $8d$ of server $2d$, that is in the projected path, exceeds threshold $10a$ at time $18a$ and so it is added to the active set earlier than would have been the case had the higher threshold $10b$ been applied. The benefit is that the active set is restricted to candidate servers with a good prospect of remaining in communication with the user equipment which improves the previously discussed capacity/quality of service trade off. So, the direction of travel of the user equipment may be taken into account in selecting the server for inclusion in the active set, such that those servers lying ahead of the moving user equipment may be preferentially included and those lying behind the user equipment preferentially excluded, despite their absolute or relative power levels.

Thus, a server with a positive or highly positive rate of change of power level as measured by the user equipment may be favoured for adding to an active set for that user equipment whereas a server with a negative or highly negative rate of change of power level as measured by the user equipment may be favoured for dropping from an active set for that user equipment. This may be so even though power levels of the two servers may be equal. In this manner, not only is the absolute or relative power level used to determine whether to add or drop a server from the active set, but also the rate of change of power level and, in particular, the sign of the rate of change of power level. Thus, for a user equipment moving away from a server, a negative rate of change of received power level would favour dropping that server, whereas for a user equipment moving towards a server, a positive rate of change of received power level would favour adding that server. By determining the members of an active set not only in dependence on the absolute or relative power levels, but also in dependence on the rate of change of power levels, the speed and direction of the user equipment may be indirectly taken into account, thereby enabling selection of servers towards which the user equipment may be heading for inclusion in the active set.

The Doppler spread of the uplink signal as received at a server from the user equipment is one possible way to estimate the speed of the user equipment. The Doppler spread can be defined as the maximum difference in frequency between different scattered components of the user equipments' transmission, that is the maximum difference in Doppler shifts between the different scattered components. Some scattered components may increase in frequency due to the motion of the user equipment while other components decrease in frequency according to whether the propagation path of respective scattered components is reduced or increased in length by the motion. This frequency difference can be measured, for example, by carrying out a long-term fast Fourier transform (FFT) of a train of pilot signals from the user equipment, and calculating the maximum frequency difference between FFT bins of significant power (i.e. of a power above the noise and interference). This Doppler spread value is directly proportional to the mobile's speed, and is inversely proportional to the carrier wavelength. This technique works most effectively within a rich scattering propagation environment, but this is in any event likely to be the case for most scenarios of practical interest.

Alternatively, the Doppler spread of signals received from one or more servers by the user equipment may be measured.

If the user equipment is equipped with a satellite navigation receiver, the motion of the user equipment in terms of speed and direction may be determined by the satellite navigation system and the determined values may be used for the calculation of a threshold for the adding or dropping of servers.

The determination of a threshold for adding or dropping servers may typically be carried out at a radio network controller. The radio network controller receives a factor indicative of the motion of the user equipment; this may be a message from the user equipment determined from measurements at the user equipment relating to rate of change of signal powers received from one or more servers, to Doppler spread, or to data derived from a satellite navigation system. Alternatively, the message may originate from a server, relating to the rate of change of a signal powers received from the user equipment and/or to Doppler spread.

The threshold may be determined at the radio controller on the basis of the factor or factors indicative of the motion of the user equipment and other factors as discussed. A message is then sent to the user equipment indicating the determined threshold and the user equipment reports to the radio controller if the threshold is exceeded (in the case of an add threshold) or if the signal falls below the threshold (in the case of a drop threshold). The add and drop threshold may be different, and may be sent separately, or alternatively one may be derived from the other at the user equipment. The controller determines whether or not a server should be added or dropped from a set on the basis of the report from the user equipment.

FIG. 12 shows typical signalling in a CDMA system implemented as an embodiment of the invention. At step S12.1 UE 1 determines a factor indicative of motion (FIM) as previously discussed, for example on the basis of Doppler spread of received signals. A message 21 is then sent to the radio network controller 3 to convey the FIM at step S12.3. The radio network controller 3 then determines a threshold applicable to at least one server in dependence on the FIM message 21 (step S12.5). The radio network controller then sends a message 22 to the user equipment conveying the determined threshold, which may be an add threshold T_ADD or a drop threshold, T_DROP, as shown at step S12.7. As discussed, a single threshold value may be used as both the add and drop threshold. At step S12.9 the user equipment 1 then compares a measure of received power of at least one server with the determined threshold. If the add threshold is determined to be exceeded to an acceptable degree of certainty or if the received power is determined to be below the drop threshold to an acceptable degree of certainty then a soft handover request message (SHOR) 23 is sent from the user equipment to the radio network controller, as shown at step S12.11. This message indicates that a threshold has been crossed and requests that a server be added or dropped. The radio network controller 3 determines (step S12.13) whether or not to add or drop the at least one server from the active set serving the user equipment 1 in dependence on the received soft handover request message 23 and on the availability of capacity at the at least one server. If it is decided to add or drop a server from the active set, this information is conveyed to the user equipment 1 by means of a server allocation message 24 (step S12.15). The server allocation message indicates to the user equipment that it should expect to receive signals from the server joining the active set, communicating amongst other data the Walsh code that new server will be using. In a variant of the embodiment illustrated by FIG. 12, factors indicating motion of the user equipment may be communicated from at least one of a plurality of servers 2a, 2b, 2c to the radio network controller 3. As previously discussed, the factors indicative of motion may be measures of Doppler spread of signals received from the user equipment or may be measures of the rate of change of signal strength received from the user equipment.

In a variant, the threshold may be determined at the user equipment 1 itself, on the basis of a factor indicative of the motion of the user equipment. In this case, the user equipment 1 sends a message 23 as before indicating to the radio network controller that the threshold has been exceeded by the signal received from a given server or that the signal has fallen below the threshold; again, there may be separate thresholds for adding as opposed to dropping servers.

At the expense of a potentially greater signalling overhead, it is also possible for the user equipment 1 to send regular indications of received signal strength to the radio network controller and for the comparison of these indications with the determined threshold to be carried out at the radio network controller rather than at the user equipment.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method comprising:
determining, by a user equipment connected to a first base station, signal power associated with a second base station;
determining a factor indicative of movement of the user equipment;
determining an adjustment component dependent on the factor;
determining a threshold of signal power for a signal from the second base station; and
determining whether to select the second base station based on the threshold and the adjustment component.

2. The method according to claim 1, wherein the user equipment operates in accordance with a long term evolution system.

3. The method according to claim 1, wherein the adjustment component is 3 dB.

4. The method according to claim 1, wherein the adjustment component is 6 dB.

5. The method according to claim 1, wherein the adjustment component varies according to the factor.

6. The method according to claim 1, wherein the adjustment component is 6 dB when the evaluated factor indicates that the speed of the user equipment is high.

7. The method according to claim 1, further comprising sending at least one indication of signal strength.

8. The method according to claim 1, further comprising determining the factor from a rate of change of a strength of a signal received from at least one other base station amongst a plurality of base stations.

9. A user equipment connected to a first base station configured to:
- determine signal power associated with a second base station;
- determine a factor indicative of movement of the user equipment;
- determine an adjustment component dependent on the factor;
- determine a threshold of signal power for a signal from the second base station; and
- determine whether to select the second base station based on the threshold and the adjustment component.

10. The user equipment according to claim 9, wherein the user equipment operates in accordance with a long term evolution system.

11. The user equipment according to claim 9, wherein the adjustment component is 3 dB.

12. The user equipment according to claim 9, wherein the adjustment component is 6 dB.

13. The user equipment according to claim 9, wherein the adjustment component varies according to the factor.

14. The user equipment according to claim 9, wherein the adjustment component is 6 dB when the evaluated factor indicates that the speed of the user equipment is high.

15. The user equipment according to claim 9, further configured to send at least one indication of signal strength.

16. The user equipment according to claim 9, further configured to determine the factor from a rate of change of a strength of a signal received from at least one other base station amongst a plurality of base stations.

* * * * *